(12) United States Patent
Paff et al.

(10) Patent No.: US 11,086,892 B1
(45) Date of Patent: *Aug. 10, 2021

(54) SEARCH RESULT CONTENT ITEM ENHANCEMENT

(71) Applicant: GOOGLE LLC, Mountain View, CA (US)

(72) Inventors: Matthew Paff, Mountain View, CA (US); Ramakrishnan Kandhan, Mountain View, CA (US); Catherine Zuo, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 905 days.

This patent is subject to a terminal disclaimer.

(21) Appl. No.: 15/684,673

(22) Filed: Aug. 23, 2017

Related U.S. Application Data

(63) Continuation of application No. 14/498,416, filed on Sep. 26, 2014, now Pat. No. 9,767,169.

(51) Int. Cl.
*G06F 16/00* (2019.01)
*G06F 16/248* (2019.01)
*G06F 16/34* (2019.01)
*G06F 16/951* (2019.01)
*G06F 16/33* (2019.01)

(52) U.S. Cl.
CPC ........ *G06F 16/248* (2019.01); *G06F 16/3331* (2019.01); *G06F 16/34* (2019.01); *G06F 16/951* (2019.01)

(58) Field of Classification Search
CPC ............. G06F 16/3329; G06F 16/3344; G06F 16/2457; G06F 16/248; G06F 16/3331; G06F 16/34; G06F 16/951; G06F 16/9535

USPC ........................................................ 707/706
See application file for complete search history.

(56) References Cited

U.S. PATENT DOCUMENTS

| | | |
|---|---|---|
| 6,788,308 B2 | 9/2004 | Reavy et al. |
| 6,839,702 B1 | 1/2005 | Patel et al. |
| 6,968,332 B1 | 11/2005 | Milic-Frayling et al. |
| 7,440,947 B2 | 10/2008 | Adcock et al. |
| 7,853,586 B1 | 12/2010 | Patel et al. |
| 7,861,149 B2 | 12/2010 | Wang et al. |
| 7,890,521 B1 | 2/2011 | Grushetskyy et al. |
| 8,259,124 B2 | 9/2012 | Averett et al. |

(Continued)

OTHER PUBLICATIONS

Abrams, Help users find, interact & re-engage with your app on the Google Assistant, Google Developers Blog, Nov. 15, 2017, 16 pages.

(Continued)

*Primary Examiner* — Vincent F Boccio
(74) *Attorney, Agent, or Firm* — Foley & Lardner LLP

(57) ABSTRACT

Systems and methods for enhancing search results for improved readability are provided. A search result is identified using a set of query terms. The search result may be first-party content or third-party content. The search result includes a first textual portion and a second textual portion. Each of the set of query terms that appear in the first textual portion are highlighted in the first textual portion. Each of the set of query terms that appear in the second textual portion but not in the first textual portion are highlighted in the second textual portion. A query response including the highlighted search result is generated and provided to a client device.

20 Claims, 5 Drawing Sheets

(56) References Cited

U.S. PATENT DOCUMENTS

| | | | |
|---|---|---|---|
| 8,527,491 | B2 | 9/2013 | Fontes et al. |
| 8,560,559 | B1 | 10/2013 | Patel et al. |
| 8,615,508 | B2 | 12/2013 | Marmaros et al. |
| 8,738,597 | B2 | 5/2014 | Bailey et al. |
| 2003/0220793 | A1* | 11/2003 | Kosaka .................. G10L 15/22 704/270 |
| 2010/0223257 | A1 | 9/2010 | Milic-Frayling et al. |
| 2013/0185081 | A1* | 7/2013 | Cheyer ............. H04M 1/72563 704/275 |
| 2017/0092278 | A1 | 3/2017 | Evermann et al. |
| 2017/0110130 | A1 | 4/2017 | Sharifi et al. |
| 2017/0110144 | A1 | 4/2017 | Sharifi et al. |
| 2017/0132019 | A1 | 5/2017 | Karashchuk et al. |
| 2017/0358301 | A1 | 12/2017 | Raitio et al. |

OTHER PUBLICATIONS

Albrecht, "Alexa, How Can You Be Used in Restaurants?", the spoon, Dec. 10, 2017, 6 pages.
Barr, "AWS DeepLens—Get Hands-On Experience with Deep Learning With Our New Video Camera", AWS News Blog, Nov. 29, 2017, 11 pages.
Buckland et al., "Amazon's Alexa Takes Open-Source Route to Beat Google Into Cars", Bloomberg, Feb. 27, 2018, 6 pages.
Coberly, "Apple patent filing reveals potential whispering Siri functionality", Techspot, Dec. 14, 2017, 4 pages.
Estes, "Amazon's Newest Gadget Is a Tablet That's Also an Echo", Gizmodo, Sep. 19, 2017, 3 pages.
Foghorn Labs, 10 Tips to Improve the Performance of Google Product Listing Ads, printed from Internet address: http://www.foghornlabs.com/2012/11/21/product-listing-ads-best-practices/, on Mar. 18, 2013, 5 pages.
Google Inc., Products Feed Specification, printed from Internet address: http://www.support.google.com/merchants/bin/answer.py?hl=en&answer=188494#US, on Mar. 18, 2013, 6 pages.
Google Inc., Supported File Formats, printed from Internet address: http://www.support.google.com/merchants/bin/answer.py?hl=en&answer=160567, on Mar. 18, 2013, 1 page.
Heater, "Amazon Alexa devices can finally tell voices apart", TechCrunch, Oct. 11, 2017, 6 pages.
Johnston, "Amazon Whirlwind: New Echo, Plus, Spot, Connect, Fire TV Take the Stage", Twice, Sep. 27, 2017, 4 pages.
Kelion, "Amazon revamps Echo smart speaker family", BBC News, Sep. 27, 2017, 11 pages.
Krishna, "Jim Beam's smart decanter will pour you a shot when you ask", engadget, Nov. 29, 2017, 3 pages.
Lacy, "Improving search and advertising are the next frontiers for voice-activated devices", TechCrunch, Dec. 20, 2017, 13 pages.
Lee, Take Two for Samsung's troubled Bixby assistant, BBC News, Oct. 19, 2017, 6 pages.
Lund, Pamela, Mastering Google Product Feeds and Product Listing Ads $2013 Part 1, found at http://www.blueglass.com/blog/mastering-google-product-feeds-and-product-listing-ads-part-1/#comments, Dec. 28, 2013, 17 pages.
Novet, et al., "Amazon is getting ready to bring Alexa to work", CNBC, Nov. 29, 2017, 4 pages.
Palladino, "Garmin teamed up with Amazon to make a tiny Echo Dot for your car", ars Technica, Oct. 17, 2017, 2 pages.
Perez, "Alexa's 'Routines' will combine smart home control with other actions, like delivering your news and weather", TechCrunch, Sep. 28, 2017, 10 pages.
Pringle, "'I'm sorry to hear that': Why training Siri to be a therapist won't be easy", CBC News, Sep. 24, 2017, 3 pages.
Unknown Author, "'Dolphin' attacks fool Amazon, Google voice assistants", BBC News, Sep. 7, 2017, 8 pages.
"Walmart and Google to offer voice-enabled shopping", BBC News, Aug. 23, 2017 (3 pages).
Amazon, "Echo Look Hands-Free Camera and Style Assistant" reprinted from https://www.amazon.com/gp/product/B0186JAEWK?ref%5F=cm%5Fsw%5Fr%5Ffa%5Fdp%5Ft2%5FC5oazbJTKCB18&pldnSite=1 on Aug. 22, 2017 (7 pages).
Broussard, Mitchel, "Chatbot-Like Siri Patent Includes Intelligent Image, Video, and Audio Recognition within Messages", MacRumors, May 11, 2017 (7 pages).
Chen, Lulu Yilun, "Alibaba Challenges Google, Amazon With New Echo-Like Device", Bloomberg Technology, Jul. 5, 2017 (3 pages).
Clover, Juli, "Amazon and Google Want to Turn Their Smart Home Speakers Into Telephone Replacements", MacRumors, Feb. 15, 2017 (5 pages).
Collins, et al., "Can Twitter Save Itself?", cnet, Apr. 26, 2017, reprinted from https://www.cnet.com/news/twitter-q1-2017-earnings/ on Aug. 22, 2017 (2 pages).
Crist, Ry, "Logitech Harmony's Alexa Skill just got a whole lot better", cnet, Jul. 13, 2017 (2 pages).
Forrest, Conner, "Essential Home wants to be 'bridge' between Amazon Alex, Apple's Siri, and Google Assistant", TechRepublic, May 31, 2017 (10 pages).
Foxx, Chris, "Apple reveals HomePod smart speaker", BBC News, Jun. 5, 2017 (6 pages).
Gebhart, Andrew, "Google Assistant is spreading, but it needs its own 'Echo Dot'", cnet, May 20, 2017 (7 pages).
Gebhart, Andrew, "Google Home to the Amazon Echo: 'Anything you can do . . . '", cnet, May 18, 2017 (7 pages).
Gibbs, Samuel, "Your Facebook Messenger app is about to be filled with ads", The Guardian, Jul. 12, 2017 (3 pages).
Golgowski, Nina, "This Burger King Ad Is Trying to Control Your Google Home Device", Huffpost, Apr. 12, 2017 (7 pages).
Google Developers, "GoogleAssistant Sdk" reprinted from https://developers.google.com/assistant/sdk/ on Aug. 22, 2017 (4 pages).
Gurman, et al., "Apple Is Manufacturing a Siri Speaker to Outdo Google and Amazon", Bloomberg, May 31, 2017 (5 pages).
Hardwick, Tim, "Facebook Smart Speaker Coming Next Year With 15-inch Touch Panel", MacRumors, Jul. 25, 2017 (5 pages).
Kelion, Leo, "Amazon's race to make Alexa smarter", BBC News, Jul. 28, 2017 (8 pages).
Koetsier, John, "Ads on Amazon Echo: Wendy's, ESPN, and Progressive Among Brands Testing", Forbes, May 11, 2017 (2 pages).
Larson, Selena, "Google Home now recognizes your individual voice", CNN Money, San Francisco, California, Apr. 20, 2017 (3 pages).
Lee, Dave, "The five big announcements from Google I/O", BBC News, May 18, 2017 (9 pages).
Nieva, Richard, "Google Home and eBay can tell you how much that's worth", cnet, Mar. 8, 2017 (3 pages).
Patently Apple, "Today Google Home's Virtual Assistant can learn its Owner's voice for Security Reasons like Apple's Patent Pending Idea", Apr. 20, 2017, reprinted from http://www.patentlyapple.com/patently-apple/2017/04/today-google-homes-virtual-assistant-can-learn-its-owners-voice-for-security-reasons-like-apples-patent-pending-idea.html on Aug. 22, 2017 (4 pages).
Patently Apple, "Apple Patent Reveals a New Security Feature Coming to Siri" Apr. 4, 2017, reprinted from http://www.patentlyapple.com/patently-apple/2017/04/apple-patent-reveals-a-new-security-feature-coming-to-siri.html, on Aug. 22, 2017 (6 pages).
Patently Mobile, "The Patent behind Google Home's new Feature of Understanding Different Voices in the Home Surfaced Today", Apr. 20, 2017, reprinted from http://www.patentlymobile.com/2017/04/the-patent-behind-google-homes-new-feature-of-understanding-different-voices-in-the-home-surfaced-today.html, on Aug. 22, 2017 (3 pages).
Perez, Sarah, "The first ad network for Alexa Skills shuts down following Amazon's policy changes Tech Crunch", Jun. 15, 2017 (6 pages).
Porter, Jon, "Amazon Echo Show release date, price, news and features", Techradar, Jun. 26, 2017 (14 pages).
Sablich, Justin, "Planning a Trip With the Help of Google Home", New York Times, May 31, 2017 (6 pages).
Sherr, Ian, "IBM built a voice assistant for cybersecurity", cnet, Feb. 13, 2017 (2 pages).
Siefert, Dan, "Samsung's new virtual assistant will make using your phone easier", The Verge, Mar. 20, 2017 (6 pages).

(56) References Cited

OTHER PUBLICATIONS

Siegal, Daniel, "IP Attys' Load Up Apps Legal Challenges at 'Silicon Beach'", Law360, Los Angeles, California, Feb. 2, 2017 (4 pages).
Smith, Dave, "The Amazon Echo got 2 incredibly useful features thanks to a new update", Business Insider, Jun. 1, 2017 (5 pages).
U.S. Notice of Allowance for U.S. Appl. No. 14/498,416 dated May 18, 2017 (5 pages).
U.S. Office Action for U.S. Appl. No. 14/498,416 dated Nov. 9, 2016 (11 pages).
Willens, Max, "For publishers, Amazon Alexa holds promise but not much money (yet)", Digiday, Jul. 6, 2017 (6 pages).

\* cited by examiner

300 —↘

302 { Buy shoes at Shoe Store
304 { www.shoestore.com/ ▼
306 { We have the best selection of shoes in the Bay Area

402 { Buy shoes at Shoe Store
404 { www.shoestore.com/ ▼
406 { We have the best selection of shoes in the Bay Area

502 { Buy shoes at Shoe Store
504 { www.shoestore.com/ ▼
506 { We have the best selection of shoes in the Bay Area

FIG. 5

SEARCH RESULT CONTENT ITEM ENHANCEMENT

CROSS-REFERENCE TO RELATED APPLICATIONS

This application claims the benefit under 35 U.S.C. § 120 a continuation of U.S. patent application Ser. No. 14/498,416, filed Sep. 26, 2014, the entire disclosure of which is incorporated herein by reference.

BACKGROUND

The Internet provides access to a wide variety of content. When a user searches for content on the Internet by submitting a query to a search engine, the search engine may return a query response that includes a plurality of search results. Search results may include hyperlinks to first-party resources (e.g., webpages, documents, images, videos, etc.) and/or third-party content items (e.g., advertisements, public service announcements, etc.) that are determined to be relevant to the query. The query response may be provided to a client device in the form of a results page. When the client selects a desired search result on the results page (e.g., by clicking on the search result), the client's browser navigates to a destination resource associated with the search result.

Some search engines enhance the results page by highlighting (e.g., bolding) various terms in the search results. Conventional highlighting techniques typically involve highlighting each term submitted as part of the search query throughout the search results. Synonyms and other terms that are semantically equivalent to the query terms may also be highlighted. While conventional highlighting techniques can sometimes assist a user in identifying desired search results, such highlighting can also distract and overwhelm the user and may cause the results page to appear cluttered. It would be desirable to enhance the results page in such a way that allows the user to readily identify relevant search results while avoiding the disadvantages of conventional highlighting techniques.

SUMMARY

One implementation of the present disclosure is a system for enhancing a search result for improved readability. The system includes a communications interface configured to receive a search query from a client device via a computer network and a processing circuit having a processor and memory. The processing circuit is configured to generate a set of query terms based on the search query and identify a search result using the set of query terms. The search result includes a first textual portion and a second textual portion. For each query term in the set of query terms, the processing circuit performs a first highlighting operation including determining whether the query term occurs in the first textual portion and, in response to a determination that the query term occurs in the first textual portion, highlighting the query term in the first textual portion and modifying the set of query terms by removing the query term from the set of query terms. For each query term remaining in the modified set of query terms after the first highlighting operation, the processing circuit performs a second highlighting operation including determining whether the query term occurs in the second textual portion and, in response to a determination that the query term occurs in the second textual portion, highlighting the query term in the second textual portion.

In some implementations, the processing circuit is configured to generate a query response including the highlighted search result and provide the query response to the client device via the computer network.

In some implementations, the search result includes at least one of a hyperlink to an indexed first-party resource and a third-party content item.

In some implementations, the first textual portion includes a title of the search result and the second textual portion includes a text snippet of the search result.

In some implementations, the processing circuit is configured to identify a plurality of search results, perform the first and second highlighting operations for each of the plurality of search results, and generate a query response including the plurality of search highlighted results.

In some implementations, highlighting the query term includes at least one of bolding the query term, underlining the query term, italicizing the query term, increasing a display size of the query term, adjusting a display color of the query term, and adjusting a background color of the query term.

Another implementation of the present disclosure is a method for enhancing a search result for improved readability. The method may be performed by a processing circuit of a computer or computer system. The method includes receiving a search query at a processing circuit having a processor and memory, generating a set of query terms based on the search query, and identifying a search result using the set of query terms. The search result includes a first textual portion and a second textual portion. The method further includes, for each query term in the set of query terms, performing a first highlighting operation including determining whether the query term occurs in the first textual portion and in response to a determination that the query term occurs in the first textual portion, highlighting the query term in the first textual portion and modifying the set of query terms by removing the query term from the set of query terms. The method further includes, for each query term remaining in the modified set of query terms subsequent to the first highlighting operation, performing a second highlighting operation including determining whether the query term occurs in the second textual portion and in response to a determination that the query term occurs in the second textual portion, highlighting the query term in the second textual portion.

In some implementations, receiving the search query includes receiving the search query from a client device via a computer network.

In some implementations, the method further includes generating a query response including the highlighted search result and providing the query response to the client device via the computer network.

In some implementations, the search result includes at least one of a hyperlink to an indexed first-party resource and a third-party content item.

In some implementations, the first textual portion includes a title of the search result and the second textual portion includes a text snippet of the search result.

In some implementations, the method includes identifying a plurality of search results, performing the first and second highlighting operations for each of the plurality of search results, and generating a query response including the plurality of search highlighted results.

In some implementations, highlighting the query term includes at least one of bolding the query term, underlining the query term, italicizing the query term, increasing a display size of the query term, adjusting a display color of the query term, and adjusting a background color of the query term.

Another implementation of the present disclosure is a method for enhancing a search result for improved readability. The method may be performed by a processing circuit of a computer or computer system. The method includes receiving, at the processing circuit via a computer network, a search query from a client device. The method further includes generating a first set of query terms based on the search query and identifying a search result using the first set of query terms. The search result includes a first textual portion and a second textual portion. The method further includes highlighting occurrences of each of the first set of query terms in the first portion of the search result, generating a second set of query terms including each of the query terms highlighted in the first portion of the search result, generating a third set of query terms including each of the first set of query terms not included in the second set of query terms, and highlighting occurrences of each of the third set of query terms in the second portion of the search result.

In some implementations, the method further includes providing a query response including the highlighted search result to the client device in response to the search query.

In some implementations, highlighting a query term includes at least one of bolding the query term, underlining the query term, italicizing the query term, increasing a display size of the query term, adjusting a display color of the query term, and adjusting a background color of the query term.

In some implementations, the search result includes at least one of a hyperlink to an indexed first-party resource and a third-party content item.

In some implementations, the first textual portion includes a title of the search result and the second textual portion includes a text snippet of the search result.

Another implementation of the present disclosure is a system for enhancing a search result for improved readability. The system includes a processing circuit having a processor and memory. The processing circuit is configured to identify a search result relevant to a set of query terms. The search result includes a first textual portion and a second textual portion. The processing circuit is configured to highlight, in the first textual portion, each of the set of query terms that appear in the first textual portion. The processing circuit is further configured to highlight, in the second textual portion, each of the set of query terms that appear in the second textual portion but do not appear in the first textual portion. The processing circuit is configured to generate a query response including the highlighted search result.

In some implementations, highlighting a query term includes at least one of bolding the query term, underlining the query term, italicizing the query term, increasing a display size of the query term, adjusting a display color of the query term, and adjusting a background color of the query term. In some implementations, the search result includes at least one of a hyperlink to an indexed first-party resource and a third-party content item.

The foregoing is a summary and thus by necessity contains simplifications, generalizations, and omissions of detail. Consequently, those skilled in the art will appreciate that the summary is illustrative only and is not intended to be in any way limiting. Other aspects, inventive features, and advantages of the devices and/or processes described herein, as defined solely by the claims, will become apparent in the detailed description set forth herein and taken in conjunction with the accompanying drawings.

BRIEF DESCRIPTION OF THE DRAWINGS

FIG. 3 is a drawing of a search result that may be provided as an input to the search result enhancement system of FIG. 1 with no highlighting applied to any of the query terms, according to a described implementation.

FIG. 4 is a drawing of the search result of FIG. 3 with query terms highlighted using conventional highlighting techniques, according to a described implementation.

FIG. 5 is a drawing of the search result of FIG. 3 with query terms highlighted according to the highlighting criteria used by the search result enhancement system of FIG. 3, according to a described implementation.

DETAILED DESCRIPTION

Figure 1:
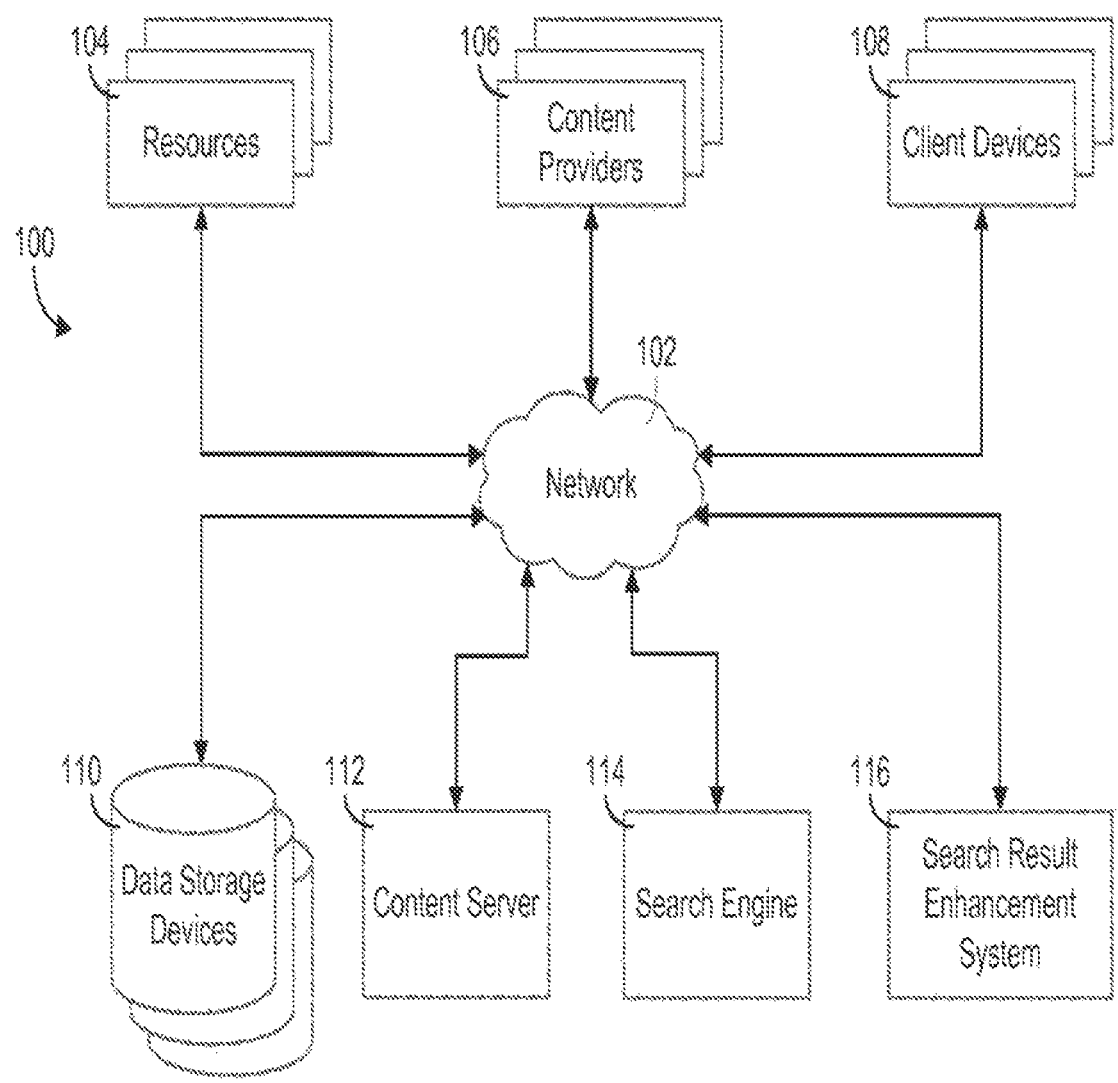
FIG. 1 is a block diagram of a computer system configured to identify and enhance search results for improved readability, the computer system including a network, resources, content providers, client devices, data storage devices, a content server, a search engine, and a search result enhancement system, according to a described implementation.

Referring generally to the FIGURES, systems and methods for enhancing search results for improved readability are shown, according to a described implementation. The systems and methods described herein may be used to generate a response to a search query received from a client device. The query response may include one or more search results such as hyperlinks to first-party resources (e.g., webpages, documents, images, videos, etc.) and/or third-party content items (e.g., advertisements, public service announcements, etc.) that are relevant to the search query. In some implementations, the query response is provided in the form of a search results page including a plurality of search results. As used herein, the term "search results" may refer to indexed first-party resources (i.e., "first-party search results"), third-party content items (i.e., "third-party search results"), or a combination of both. A search result may include multiple textual portions such as a title, a visible URL, and a text snippet (e.g., text extracted from a first-party resource, an ad creative, etc.).

Each search result may be enhanced by highlighting (e.g., bolding, underlining, italicizing, increasing a display size, changing a display color, etc.) various terms that appear in the text of the search result. Highlighted terms may include terms that are received as part of a user-submitted search query and, in some implementations, terms that are semantically equivalent to such user-submitted terms. Techniques such as latent semantic indexing and/or adjusting pluralization may be used to generate an expanded set of query terms based on a user-submitted search query. The expanded set of query terms may be used for both identifying relevant search results and highlighting terms in the identified search results.

A search result enhancement system may parse the text of each search result to identify occurrences of the query terms. For each search result, the system may perform a multi-stage highlighting process to highlight various terms that appear in the text of the search result. A first stage of the highlighting process may include identifying and highlighting each of the set of query terms in a first portion of the search result (e.g., the title). If a term is highlighted in the first portion of the search result, the term may be removed from the set of query terms. A second stage of the highlighting process may include identifying and highlighting, in a second portion of the search result (e.g., the text snippet), any remaining query terms that have not already been highlighted in the first portion.

Using this highlighting process, each occurrence of a query term in the first portion of the search result may be highlighted. However, only query terms that appear in the second portion of the search result without appearing in the first portion of the search result may be highlighted in the second portion. In other words, if a query term is highlighted in the first portion of a search result, the same query term may not be highlighted in the second portion of the same search result. However, if a query term does not appear in the first portion of a search result, the query term may be highlighted in the second portion of the search result.

This highlighting process prevents excessive highlighting while ensuring that each query term that appears in the search result is highlighted at least once in the search result. Such a highlighting process preserves the advantages of highlighting for users who skim the search results by looking at only the highlighted terms. Any query term excluded from highlighting in the second portion of the search result may still be highlighted in the first portion of the search result. Accordingly, each query term that appears in the search result may be highlighted at least once, but with less duplication relative to traditional highlighting techniques. The highlighting process outlined above may result in less highlighting relative to traditional highlighting techniques and may cause the search results to appear cleaner and less cluttered.

Referring now to FIG. 1, a block diagram of a computer system 100 is shown, according to a described implementation. Computer system 100 may be used to implement the systems and methods of the present disclosure. In brief overview, computer system 100 is shown to include a network 102, resources 104, content providers 106, client devices 108, data storage devices 110, a content server 112, a search engine 114, and a search result enhancement system 116.

Network 102 may be a local area network (LAN), a wide area network (WAN), a cellular network, a satellite network, a radio network, the Internet, a telephone network (e.g., the Public Switched Telephone Network (PSTN)), a wireless link, an intranet, or any other type of data network or combination thereof. Network 102 may include any number of computing devices (e.g., computers, servers, routers, network switches, etc.) configured to transmit, receive, or relay data. Network 102 may include any number of hardwired and/or wireless connections. For example, client devices 108 may communicate wirelessly (e.g., via WiFi, cellular, radio, etc.) with a transceiver that is hardwired (e.g., via a fiber optic cable, a CAT5 cable, etc.) to a computing device of network 102.

Network 102 may facilitate communication between various components of computer system 100. For example, client devices 108 may submit search queries to search engine 114 via network 102. Search engine 114 may parse the search queries and identify resources 104 that are relevant to the search queries. Search engine 114 may also interact with content server 112 via network 102 to identify third-party content items that are relevant to the search queries. Search engine 114 may generate one or more search results (e.g., first-party resources, third-party content items, etc.) that are relevant to the search queries and provide the search results, via network 102, to search result enhancement system 116. Search result enhancement system 116 may highlight one or more query terms in the search results and provide the enhanced search results to client devices 108 in response to the search query.

Still referring to FIG. 1, computer system 100 is shown to include resources 104. Resources 104 may include any type of information or data structure that can be provided over network 102. In some implementations, resources 104 may be identified by a resource address associated with each resource (e.g., a resource URL). Resources 104 may include webpages (e.g., HTML webpages, PHP webpages, etc.), word processing documents, portable document format (PDF) documents, images, video, programming elements, interactive content, streaming video/audio sources, or other types of first-party content. Resources 104 may include content having embedded information (e.g., meta-information embedded in hyperlinks) and/or embedded instructions. Embedded instructions may include computer-readable instructions (e.g., software code, JavaScript®, ECMAScript®, etc.) which are executed by client devices 108 (e.g., by a web browser running on client devices 108) upon viewing content.

Resources 104 may include a search results page. The search results page may include one or more search results (e.g., first-party resources, third-party content items, etc.) identified as relevant to a user-submitted search query. The search results page may be provided to client devices 108 in response to a search query received from client devices 108. In some implementations, resources 104 include an interface for interacting with search engine 114. For example, resources 104 may include a webpage with a search field that allows a user to enter a search query and submit the search query to search engine 114. Search engine 114 may use the search query to identify relevant first-party search results. In some implementations, search engine 114 provides the search query (or a set of query terms based on the search query) to content server 112. Content server 112 may use the search query to identify relevant third-party search results. The search results page may be generated by search engine 114, content server 112, or a combination of both, and may include a combination of first-party search results and third-party search results.

Resources 104 may include landing pages for various search results on the search results page. For example, the search results may include a hyperlink URL (e.g., given by a href attribute) which specifies a location of a destination resource. Client devices 108 may be directed to resources 104 upon clicking or otherwise interacting with a search result. In some implementations, resources 104 provide additional information relating to a product, service, or business featured in first-party search result or a third-party content item. For example, resources 104 may host a resource through which a product or service featured in the third-party content item may be purchased.

Resources 104 may include slots for presenting third-party content items in conjunction with the first-party content. For example, resources 104 may include one or more inline frame elements (e.g., HTML "iframe" elements, <iframe> . . . </iframe>) for presenting third-party content items from content providers 106. An inline frame can be the "target" frame for links defined by other elements and can be selected by user agents (e.g., client devices 108, a web browser running on client devices 108, etc.) as the focus for printing, viewing its source, or other forms of user interaction. The content slots may cause client devices 108 to request third-party content items from content server 112 in response to viewing first-party resource content from resources 104.

In some implementations, resources 104 may be combined with content providers 106. For example, resources 104 may include data stored on the one or more electronic devices (e.g., computers, servers, etc.) which define content providers 106. In other implementations, resources 104 may be separate from content providers 106. For example, resources 104 may include data stored on a remote server (e.g., FTP servers, file sharing servers, web servers, etc.), combinations of servers (e.g., data centers, cloud computing platforms, etc.), or other data storage devices separate from the devices which define content providers 106.

Still referring to FIG. 1, computer system 100 is shown to include content providers 106. Content providers 106 may include one or more electronic devices representing advertisers, resource operators, business owners, or other entities using the services provided by content server 112. In some implementations, content providers 106 may produce third-party content items (e.g., an ad creative) for presentation to client devices 108. In other implementations, content providers 106 may submit a content generation request to content server 112 and content server 112 may automatically generate a third-party content item in response to the request. The third-party content items may be stored in one or more data storage devices local to content providers 106, within content server 112, or in data storage devices 110.

In some implementations, the third-party content items may be advertisements. The advertisements may be display advertisements such as image advertisements, Flash® advertisements, video advertisements, text-based advertisements, or any combination thereof. In other implementations, the third-party content items may include other types of content which serve various non-advertising purposes (e.g., public service announcements). The third-party content items may be displayed in a content slot of resources 104 and presented to client devices 108 alongside first-party content from resources 104.

In some implementations, content providers 106 submit campaign parameters to content server 112. The campaign parameters may be used to control the distribution of third-party content items to client devices 108. The campaign parameters may include keywords associated with the third-party content items, bids corresponding to the keywords, a content distribution budget, geographic limiters, or other criteria used by content server 112 to determine when a third-party content item may be presented to client devices 108.

Content providers 106 may access content server 112 to monitor the performance of the third-party content items distributed according to the established campaign parameters. For example, content providers 106 may access content server 112 to review one or more performance metrics associated with a third-party content item or set of third-party content items. The performance metrics may describe interactions between client devices 108 and a distributed third-party content item or set of third-party content items (e.g., number of impressions, number of clicks, number of conversions, revenue, attributable purchases, etc.).

Still referring to FIG. 1, computer system 100 is shown to include client devices 108. Client devices 108 may include any number and/or type of user-operable electronic devices. Client devices 108 may include desktop computers, laptop computers, smartphones, tablets, mobile communication devices, remote workstations, client terminals, entertainment consoles, or any other devices capable of interacting with the other components of computer system 100 (e.g., via a communications interface). For example, client devices 108 may be capable of receiving first-party content from resources 104 and/or third-party content items from content providers 106 or content server 112. Client devices 108 may include mobile devices or non-mobile devices.

In some implementations, client devices 108 include an application (e.g., a web browser, a resource renderer, etc.) for converting electronic content into a user-comprehensible format (e.g., visual, aural, graphical, etc.). Client devices 108 may include a user interface element (e.g., an electronic display, a speaker, a keyboard, a mouse, a microphone, a printer, etc.) for presenting content to a user, receiving user input, and/or facilitating user interaction with electronic content (e.g., clicking on a content item, hovering over a content item, etc.). Client devices 108 may function as a user agent for viewing HTML encoded content. Client devices 108 may include a processor capable of processing embedded information (e.g., meta information embedded in hyperlinks, etc.) and executing embedded instructions. Embedded instructions may include computer-readable instructions (e.g., software code, JavaScript®, ECMAScript®, etc.) associated with a content slot within which a third-party content item is presented.

In some implementations, client devices 108 may be capable of detecting an interaction with a distributed third-party content item. An interaction with a third-party content item may include displaying the content item, hovering over the content item, clicking on the content item, viewing source information for the content item, or any other type of interaction between client devices 108 and a content item. Interaction with a third-party content item does not require explicit action by a user with respect to the content item. In some implementations, an impression (e.g., displaying or presenting the content item) may qualify as an interaction. The criteria for defining which actions (e.g., active or passive) qualify as an interaction may be determined on an individual basis (e.g., for each content item), by content providers 106 (e.g., according to established campaign parameters), or by content server 112.

Still referring to FIG. 1, computer system 100 is shown to include data storage devices 110. Data storage devices 110 may be any type of memory device capable of storing profile data, content item data, or any other type of data used by content server 112 or search engine 114. Data storage devices 110 may include any type of non-volatile memory, media, or memory devices. For example, data storage devices 110 may include semiconductor memory devices (e.g., EPROM, EEPROM, flash memory devices, etc.) magnetic disks (e.g., internal hard disks, removable disks, etc.), magneto-optical disks, and/or CD ROM and DVD-ROM disks. In some implementations, data storage devices 110 may be local to content server 112, content providers 106, or search engine 114. In other implementations, data storage devices 110 may be remote data storage devices connected with content server 112 and/or search engine 114 via network 102. In some implementations, data storage devices 110 may be part of a data storage server or system capable of receiving and responding to queries from content server 112 and/or search engine 114.

In some implementations, data storage devices 110 store profile data for client devices 108. Profile data may include, for example, interest data, behavioral data, or other data which may be relevant in selecting third-party content items for distribution to client devices 108. Profile data stored in data storage devices 110 may also be used (e.g., by content server 112) to select and/or rank third-party content items to provide in response to a search query from a particular client device.

For situations in which the systems discussed here collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated (e.g., by content server 112) in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, a user may have control over how information is collected (e.g., by an application, by client devices 108, etc.) and used by content server 112. In some implementations, content providers may be provided with similar control options regarding the collection and use of content provider data (e.g., data associated with particular content providers, data extracted from a resource, etc.).

Still referring to FIG. 1, computer system 100 is shown to include a content server 112. Content server 112 may be configured to receive requests for third-party content items from client devices 108 and/or search engine 114 and select one or more relevant third-party content items in response to the request. Content server 112 may include a processing circuit having a processor and memory. The processor may be implemented as a general purpose processor, an application specific integrated circuit (ASIC), one or more field programmable gate arrays (FPGAs), a CPU, a GPU, a group of processing components, or other suitable electronic processing components. The memory may include one or more devices (e.g., RAM, ROM, flash memory, hard disk storage, etc.) for storing data and/or computer code for completing and/or facilitating the various processes, layers, and modules described in the present disclosure. The memory may include volatile memory or non-volatile memory and may include database components, object code components, script components, or any other type of information structure for supporting the various activities and information structures described in the present disclosure. In some implementations, the memory is communicably connected to the processor via the processing circuit and includes computer code (e.g., data modules stored in memory) for executing one or more processes described herein.

Content server 112 may receive a request for a third-party content item from search engine 114 or client devices 108. In some implementations, the request may include characteristics of one or more content slots in which the content items will be displayed. For example, such characteristics may include the URL of the resource (e.g., a webpage, a search results page, etc.) in which the content slot is located, a display size of the content slot, a position of the content slot, and/or media types that are available for presentation in the content slot. If the content slot is located on a search results page, a set of query terms may also be provided to content server 112. The set of query terms may facilitate identification of third-party content items that are relevant to the search query.

Content server 112 may select one or more eligible third-party content items in response to the request. In some implementations, eligible third-party content items include content items having characteristics matching the characteristics of the content slots in which the content items are to be presented. For example, content server 112 may select a third-party content item having a display size which fits in a destination content slot. In some implementations, content server 112 may resize a selected content item to fit a content slot or add additional visual content to the selected content item (e.g., padding, a border, etc.) based on the display size of the content item and the display size of the content slot.

In some implementations, content server 112 selects a third-party content item determined to be relevant to particular first-party resource, client device 108, or search query. For example, content server 112 may select a content item by comparing the keywords associated with each content item (e.g., specified by content providers 106, additional keywords extracted from the content item, etc.) with the keywords associated with the first-party resource or client device 108 requesting the third-party content item. If the first-party resource is a search results page, a set of query terms may be used to establish keywords for the resource. Content server 112 may receive a set of query terms from search engine 114 and use the query terms to select a third-party content item related to the search query. The selected third-party content item may be presented on the search results page in conjunction with first-party search results identified by search engine 114.

In some implementations, content server 112 may select a third-party content item by comparing the keywords associated with each content item with information (e.g., profile data, user interests, user preferences, etc.) associated with a particular client device 108 requesting the content item. In some implementations, content server 112 selects a content item based on user profile information independent from a particular client device. For example, if a client device is logged into an online account or profile, information associated with the account or profile (e.g., demographic information, user interests, user preferences, etc.) may be used to select a content item for distribution to the client device. A client device may be associated with one or more users, user accounts, and/or user profiles. In some implementations, content server 112 selects a third-party content item that does not match established user preferences if an insufficient number of preferred content items are available. In some implementations, content server 112 may select a third-party content item based on an established click-through-rate, a predicted click-through-rate, a bid price associated with each content item, or other relevant selection criteria.

In some implementations, the selected third-party content item is transmitted to resources 104 for presentation to client devices 108 along with first-party content from resources 104. In some implementations, the selected third-party content item is provided to search engine 114 for inclusion in a list of search results. In other implementations, the selected content item is delivered to the client devices 108 directly (e.g., without first transmitting the content item to resources 104) from content server 112 or from data storage devices 110. Content server 112 may assign each third-party content item a unique identifier (e.g., a signature attribute) for measuring or recording user interactions with distributed content items. Each third-party content item may include multiple textual portions such as a title with an embedded hyperlink, a visible URL associated with the hyperlink, and a text snippet. The text snippet may be an ad creative or other descriptive text associated with the third-party content item.

Still referring to FIG. 1, computer system 100 is shown to include a search engine 114. Search engine 114 may be configured to receive a search query (e.g., a string of text) from client devices 108 via an input feature (e.g., an input text box, etc.). Search engine 114 may parse search query to identify one or more query terms. For example, if a client device submits the text string "cheap flowers bay area," search engine 114 may identify the query terms "cheap," "flowers," "bay," and "area." In some implementations, search engine 114 uses various techniques to expand the user-submitted query terms. Such techniques may include identifying synonyms of the user-submitted query terms, adjusting the pluralization of the user-submitted query terms, and/or identifying additional terms that are semantically equivalent to one or more of the user-submitted query terms. Search engine 114 may use query expansion techniques such as latent semantic indexing (LSI) to identify additional query terms that have the same meaning as the user-submitted query terms. For example, search engine 114 may identify the term "inexpensive" as a synonym for the query term "cheap." Search engine 114 may identify the term "florist" as a semantic equivalent of the term "flowers" since the original query implies that the user is searching for a vendor that sells cheap flowers (i.e., a florist). Search engine 114 may identify the term "flower" as singular version of the term "flowers." In some implementations, search engine 114 corrects misspellings in the original query and/or suggests alternative query terms based on the original query. Search engine 114 may generate a set of query terms that includes both the original query terms and any expanded terms based on the original query.

In some implementations, search engine 114 generates a data structure (e.g., an array, a vector, a list, etc.) representing the generated set of query terms. Each query term may be stored as a separate element of the data structure. For example, if a client device submits the text string "cheap flowers bay area," search engine 114 may generate the following data structure:

{cheap, inexpensive, flower, flowers, florist, bay, area} where the query terms "cheap," "flowers," "bay," and "area" are part of the original search string and the query terms "inexpensive," "flower," and "florist" are expanded terms added to the set of query terms by search engine 114.

Search engine 114 may search an index of first-party resources (e.g., documents, webpages, etc.) for relevant first-party search results using the generated set of query terms. Search engine 114 may identify one or more search results that are determined to be relevant to the set of query terms. In some implementations, search engine 114 formats each search result to include multiple textual portions. Each search result may include, for instance, a title with an embedded hyperlink to a first-party resource determined to be relevant to the query terms, a visible URL displaying a portion of the URL associated with hyperlink, and a descriptive text snippet extracted from the associated first-party resource or provided by a third-party content provider. Search engine 114 may select or generate the title and/or the descriptive text snippet based on the content of the associated first-party resource. The various textual portions of the search result may include one or more of the set of query terms. Search engine 114 may provide the search results to search result enhancement system 116 to highlight a selection of the query terms that appear in the textual portions of the search result, as described in greater detail below.

Search engine 114 may generate a search results page that includes the highlighted search results. The search results page may be provided to the client device in response to the search query. In some implementations, search engine 114 provides the set of query terms to content server 112 in conjunction with a request for one or more third-party content items related to the search query. The content item request may include additional information, such as the user device information, the resource information, a quantity of content items, a format for the content items, the search query string, keywords of the search query string, information related to the query (e.g., geographic location information and/or temporal information), or other parameters that may be used by content server 112 to select relevant/suitable third-party content items. Content server 112 may select third-party content items as described above and provide the selected third-party content items to search engine 114 for presentation in a content item slot of the search result page. In some implementations, a delineation may be made between the first-party search results and the third-party content items to avert confusion.

Still referring to FIG. 1, computer system 100 is shown to include a search result enhancement system 116. Search result enhancement system 116 may be configured to receive search results from search engine 114 and/or content server 112 and perform a highlighting operation to highlight one or more query terms in the search results. In various implementations, search result enhancement system 116 may be a component of content server 112, search engine 114, client devices 108 (e.g., integrated with a web browser application executing on client devices 108) or a separate system, as shown in FIG. 1. Although the components of system 100 are shown as separate components in FIG. 1, it should be understood that, in some implementations, content server 112, search engine 114, and search result enhancement system 116 may be components of a single integrated system.

In some implementations, search result enhancement system 116 includes the functionality of content server 112 and/or search engine 114. For example, search result enhancement system 116 may receive a search query submitted by a client device and generate a set of query terms based on the search query. Search result enhancement system 116 may identify one or more search results (e.g., first-party resources, third-party content items) based on the query terms. In other implementations, search result enhancement system 116 receives a set of pre-identified search results and a set of query terms from content server 112 and/or search engine 114. Each search result may include at least a first textual portion (e.g., a title) and a second textual portion (e.g., a text snippet).

In some implementations, search result enhancement system 116 highlights, in the first textual portion, each of the set of query terms that appear in the first textual portion. Search result enhancement system 116 may then highlight, in the second textual portion, each of the set of query terms that appear in the second textual portion but do not appear in the first textual portion. In other words, each of the set of query terms that appears in the first textual portion may be highlighted in the first textual portion. However, any of the query terms that appear in the second textual portion may be highlighted in the second textual portion only if such terms are not highlighted in the first textual portion.

In some implementations, search result enhancement system 116 performs a multi-stage highlighting process to identify and highlight query terms in the search results. For example, for each query term in the set of query terms, search result enhancement system 116 may perform a first highlighting operation. The first highlighting operation may include determining whether the query term occurs in the first textual portion. For each query term that occurs in the first textual portion, the first highlighting operation may include highlighting the query term in the first textual portion and modifying the set of query terms by removing the query term from the set of query terms. For each query term remaining in the modified set of query terms after the first highlighting operation, search result enhancement system 116 may perform a second highlighting operation. The second highlighting operation may include determining whether the query term occurs in the second textual portion. For each remaining query term that occurs in the second textual portion, the second highlighting operation may include highlighting the query term in the second textual portion.

In some implementations, search result enhancement system 116 identifies the set of query terms as a first set of query terms. For each search result, search result enhancement system 116 may highlight occurrences of each of the first set of query terms in the first portion of the search result. Search result enhancement system 116 may generate a second set of query terms including each of the query terms highlighted in the first portion of the search result. Search result enhancement system 116 may also generate a third set of query terms including each of the first set of query terms not included in the second set of query terms. Search result enhancement system 116 may highlight occurrences of each of the third set of query terms in the second portion of the search result.

The highlighting operations performed by search result enhancement system 116 may include modifying a search result to make certain portions of the search result more noticeable when the search result is displayed to a user. For example, highlighting a query term in a search result may include bolding the query term, underlining the query term, italicizing the query term, increasing a display size of the query term, changing a display color the query term, or applying any other highlighting and/or emphasizing effect to the query term. In some implementations, the search result may be represented using HTML code and search result enhancement system 116 highlights a query term in a search result by adding HTML tags around the query term. For example, search result enhancement system 116 may insert bold tags (i.e., <b>query_term</b>), emphasized text tags (i.e., <em>query_term</em>), italics tags (i.e., <i>query_term</i>), strong text tags (i.e., <strong>query_term</strong>), marked tags (i.e., <mark>query_term</mark>), or other types of HTML tags around a query term in the HTML code of the search result to highlight the query term.

In some implementations, search result enhancement system 116 uses Cascading Style Sheets (CSS) to highlight query terms in the search results. Search result enhancement system 116 may insert span tags (or any other type of HTML tag) around a query term with a CSS attribute (e.g., style, id, class, etc.) enhancing the query term within the tag. For example search result enhancement system 116 may insert the following HTML tag around a query term in the HTML code of a search result:

<span style="property:type">query_term</span> where the "property" parameter defines a property of the CSS style attribute and the "type" parameter defines a specific type of the property (e.g., "font-family:verdana," "font-size:160%," "color:red," "background-color:yellow," etc.). Search result enhancement system 116 may use inline styling (e.g., using the "style" attribute in HTML elements), internal styling (e.g., using the <style> element in the <head> section of the HTML document), external styling (e.g., using external CSS files), or any other type of styling to highlight query terms in the search results. Search result enhancement system 116 may generate modified search results by inserting HTML tags around specified query terms and send the modified search results to client devices 108 for rendering and presentation to a user.

Figure 2:
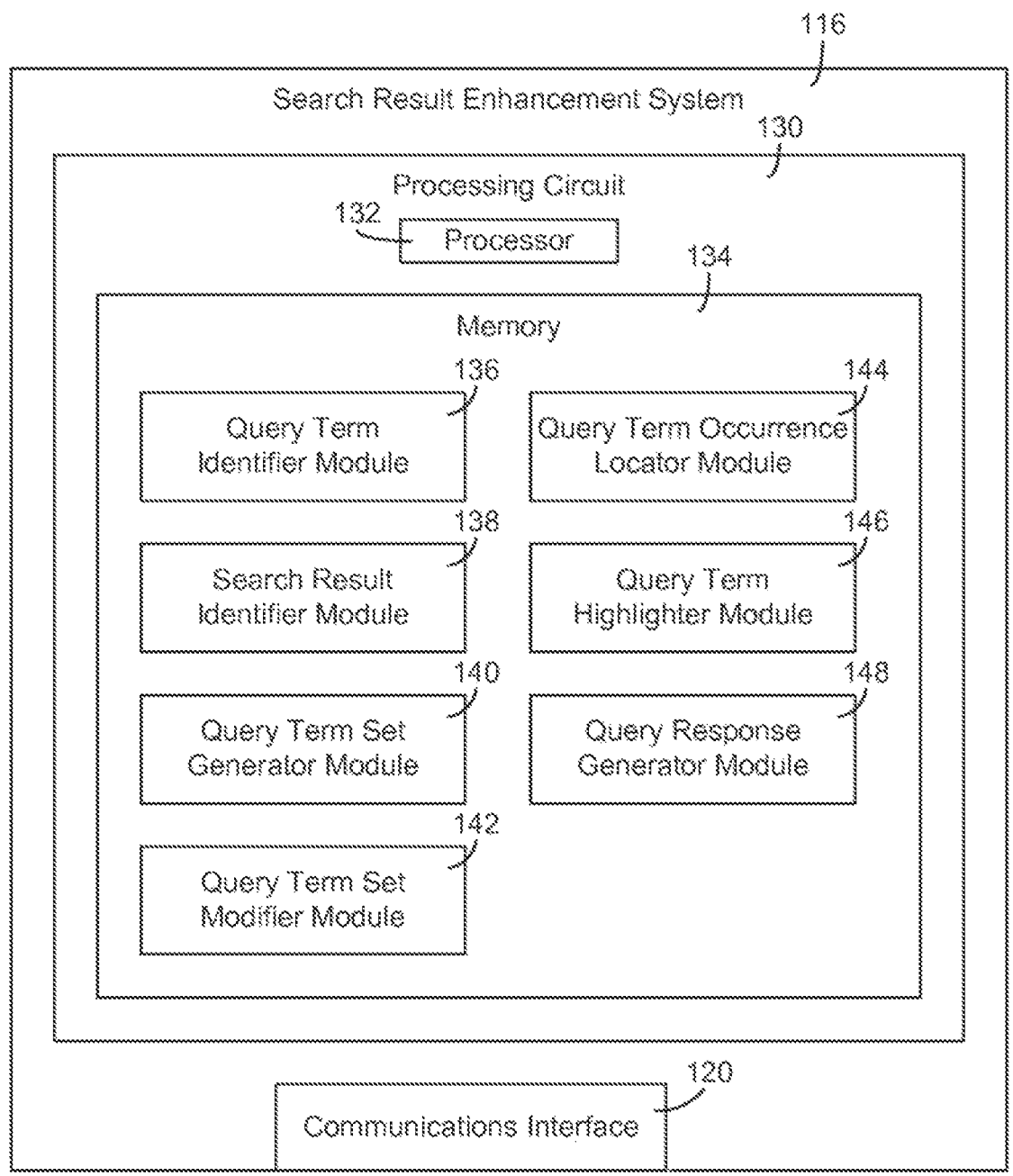
FIG. 2 is a block diagram illustrating the search result enhancement system of FIG. 1 in greater detail, according to a described implementation.

Referring now to FIG. 2, a block diagram illustrating search result enhancement system 116 in greater detail is shown, according to a described implementation. Search result enhancement system 116 is shown to include a communications interface 120 and a processing circuit 130. Communications interface 120 may include wired or wireless interfaces (e.g., jacks, antennas, transmitters, receivers, transceivers, wire terminals, Ethernet ports, WiFi transceivers, etc.) for conducting data communications with local or remote devices or systems. Communications interface 120 may allow search result enhancement system 116 to communicate with network 102, resources 104, content providers 106, client devices 108, and data storage devices 110, content server 112, and search engine 114. In some implementations, communications interface 120 receives a search query from client devices 108 via a network 102. In other implementations, communications interface 120 receives a set of query terms and a set of search results from content server 112 and/or search engine 114 via network 102.

Still referring to FIG. 2, processing circuit 130 is shown to include a processor 132 and memory 134. Processor 132 may be implemented as a general purpose processor, an application specific integrated circuit (ASIC), one or more field programmable gate arrays (FPGAs), a CPU, a GPU, a group of processing components, or other suitable electronic processing components.

Memory 134 may include one or more devices (e.g., RAM, ROM, flash memory, hard disk storage, etc.) for storing data and/or computer code for completing and/or facilitating the various processes, layers, and modules described in the present disclosure. Memory 134 may comprise volatile memory or non-volatile memory. Memory 134 may include database components, object code components, script components, or any other type of information structure for supporting the various activities and information structures described in the present disclosure. In some implementations, memory 134 is communicably connected to processor 132 via processing circuit 130 and includes computer code (e.g., data modules stored in memory 134) for executing one or more processes described herein. In brief overview, memory 134 is shown to include a query term identifier module 136, a search result identifier module 138, a query term set generator module 140, a query term set modifier module 142, a query term occurrence locator module 144, a query term highlighter module 146, and a query response generator module 148.

Still referring to FIG. 2, memory 134 is shown to include a query term identifier module 136. Query term identifier module 136 may be configured to identify one or more query terms based on a user-submitted search query. In some implementations, query term identifier module 136 receives the user-submitted search query via communications interface 120. The user submitted-search query may include a text string having one or more query terms. Query term identifier module 136 may include some or all of the functionality of search engine 114, as described with reference to FIG. 1. For example, query term identifier module 136 may parse search query to identify the one or more query terms. In some implementations, query term identifier module 136 uses various techniques to expand the user-submitted query terms. Such techniques may include identifying synonyms of the user-submitted query terms, adjusting the pluralization of the user-submitted query terms, and/or identifying additional terms that are semantically equivalent to one or more of the user-submitted query terms. Query term identifier module 136 may use query expansion techniques such as latent semantic indexing (LSI) to identify additional query terms that have the same meaning as the user-submitted query terms. In some implementations, query term identifier module 136 corrects misspellings in the original query and/or suggests alternative query terms based on the original query.

In other implementations, query term identifier module 136 receives a list of expanded query terms from search engine 114. The list of expanded query terms may be generated by search engine 114 and provided to query term identifier module 136 via network 102. Search engine 114 may perform the query expansion operations described above and provide the expanded list of query terms to query term identifier module 136. Query term identifier module 136 may parse the list of query terms to identify one or more query terms.

Still referring to FIG. 2, memory 134 is shown to include a search result identifier module 138. Search result identifier module 138 may be configured to identify one or more search results that are relevant to identified query terms. Search results may include hyperlinks to first-party resources, third-party content items, or a combination of both. In some implementations, search result identifier module 138 includes the functionality of content server 112 and/or search engine 114, as described with reference to FIG. 1. For example, search result identifier module 138 may be configured to select one or more third-party content items from a database of third-party content items. Search result identifier module 138 may select third-party content items that are relevant to the identified query terms. Search result identifier module 138 may be configured to search an index of first-party resources (e.g., documents, webpages, etc.) for relevant first-party search results using the identified query terms. Search result identifier module 138 may identify one or more search results that are determined to be relevant to the set of query terms.

In other implementations, search result identifier module 138 receives a collection of search results from content server 112 and/or search engine 114. The search results may be generated by content server 112 and/or search engine 114 and provided to search result identifier module 138 via network 102. Search result identifier module 138 may receive the search results and identify the search results as relevant to the identified query terms.

In some implementations, search result identifier module 138 formats each search result to include multiple textual portions. For example, search result identifier module 138 may format each search result to include a title with an embedded hyperlink, a visible URL displaying a portion of the URL associated with hyperlink, and/or a text snippet (e.g., a descriptive text snippet extracted from a first-party resource, an ad creative, etc.). In some instances, the textual portions may include one or more of the query terms.

Still referring to FIG. 2, memory 134 is shown to include a query term set generator module 140. Query term set generator module 140 may be configured to generate one or more sets of query terms using the query terms identified by query term identifier module 136. In some implementations, query term set generator module 140 generates a first set of query terms that includes all of the identified query terms. Query term set generator module 140 may receive input from query term occurrence locator module 144 to determine which of the first set of query terms occur in a first portion (e.g., the title) of each search result.

For each search result, query term set generator module 140 may generate a second set of query terms including only the query terms that occur in the first portion of the search result. For each search result, query term set generator module 140 may generate a third set of query terms including each of the first set of query terms not included in the second set of query terms. The second set of query terms and the third set of query terms may be discrete sets that together include all of the query terms in the first set. Query term highlighter module 146 may use the generated sets of query terms to determine which query terms to highlight in the various textual portions of each search result.

Still referring to FIG. 2, memory 134 is shown to include a query term set modifier module 142. Query term set modifier module 142 may be configured to modify one or more of the sets of query terms generated by query term set generator module 140. In some implementations, query term set modifier module 142 receives input from query term occurrence locator module 144 to determine which of the first set of query terms occur in the first portion of each search result. Query term set modifier module 142 may process each search result independently and generate a separate modified set of query terms for each search result.

For each search result, query term set modifier module 142 may generate a modified set of query terms by removing, from the first set of query terms, any query terms that occur in the first portion of the search result. Each modified set of query terms may include all of the query terms in the first set of query terms (i.e., all of the query terms identified by query term identifier module 136) except for the query terms that occur in the first portion of the corresponding search result. Accordingly, the modified set of query terms generated by query term set modifier module 142 for a particular search result may be the same or similar to the third set of query terms generated by query term set generator module 140 for the same search result. Query term highlighter module 146 may use the modified set of query terms to determine which query terms to highlight in the second textual portion of each search result.

Still referring to FIG. 2, memory 134 is shown to include a query term occurrence locator module 144. Query term occurrence locator module 144 may be configured to determine which of the query terms in a given set of query terms occur in a given portion of a search result. Query term occurrence locator module 144 may receive various sets of query terms from query term set generator module 140 and/or query term set modifier module 142. Query term occurrence locator module 144 may also receive each search result from search result identifier module 138. Query term occurrence locator module 144 may process each search result independently and provide a separate determination for each search result.

For each search result, query term occurrence locator module 144 may determine which of the first set of query terms occur in the first portion of the search result. Query term occurrence locator module 144 may output a list of query terms that occur in the first portion of each search result to query term set generator module 140 and/or query term set modifier module 142 for use in generating the second set of query terms, the third set of query terms, and/or the modified set of query terms as described above. For each search result, query term occurrence locator module 144 may determine which of the third set of query terms or the modified set of query terms occur in the second portion of the search result. Query term occurrence locator module 144 provide locations of query term occurrences to query term highlighter module 146 for use in a query term highlighting operation.

Still referring to FIG. 2, memory 134 is shown to include a query term highlighter module 146. Query term highlighter module 146 may be configured to highlight occurrences of query terms in each search result based on inputs received from modules 140-144. Query term highlighter module 146 may process each search result independently and, in some instances, highlight different query terms in various portions of each search result. Highlighting a query term may include, for example, bolding the query term, underlining the query term, increasing a display size of the query term, adjusting a display color of the query term, adjusting a background color of the query term, or applying any other type of distinguishing or emphasizing effect to the query term.

In some implementations, query term highlighter module 146 highlights, in the first textual portion of a search result, each of the first set of query terms that appear in the first textual portion. Query term highlighter module 146 may then highlight, in the second textual portion of the search result, each of the set of query terms that appear in the second textual portion but not in the first textual portion. In other words, query term highlighter module 146 may highlight query terms in the second textual portion of a search result only if such terms are not highlighted in the first textual portion of the same search result.

In some implementations, query term highlighter module 146 performs a multi-stage highlighting process for each search result to highlight query terms in the search result. For each query term in the first set of query terms, query term highlighter module 146 may perform a first highlighting operation. The first highlighting operation may include highlighting the query term in the first portion of the search result. Query term highlighter module 146 may then allow the first set of query terms to be modified by query term set modifier module 142, resulting in a modified set of query terms for the search result. For each query term remaining in the modified set of query terms after the first highlighting operation, query term highlighter module 146 may perform a second highlighting operation. The second highlighting operation may include highlighting the query term in the second textual portion.

In some implementations, query term highlighter module 146 highlights occurrences of each of the first set of query terms in the first portion of each search result. Query term highlighter module 146 may receive the third set of query terms for each search result from query term set generator module 140. Query term highlighter module 146 may process each search result independently using the corresponding third set of query terms. For each query term in the third set of query terms, query term highlighter module 146 may highlight occurrences of the query term in the second portion of the search result.

Still referring to FIG. 2, memory 134 is shown to include a query response generator module 148. Query response generator module 148 may be configured to generate a query response including one or more of the highlighted search results. The query response may be provided in the form of a search results page to the client device originating the query. In some implementations, the query response includes a plurality of search results. The query response may include first-party search results, third-party search results, or a combination of both. In some implementations, query response generator module 148 may present the first-party search results and the third-party search results in different portions of the search results page or otherwise distinguish between first-party search results and third-party search results to avert confusion.

Referring now to FIGS. 3-5, several versions 300, 400, and 500 of a search result are shown, according to a described implementation. FIG. 3 illustrates a version 300 of the search result with no highlighting applied to any of the query terms. FIG. 4 illustrates a version 400 of the search result with query terms highlighted using conventional highlighting techniques. FIG. 5 illustrates a version 500 of the search result with query terms highlighted according to the highlighting criteria used by search result enhancement system 116.

The search result shown in FIGS. 3-5 may be identified by search engine 114 or content server 112 as relevant to the search query "shoe stores bay area" submitted by a client device. The search result may be a first-party search result or a third-party content item and may include multiple textual portions. For example, the search result is shown to include a title (i.e., titles 302, 402, and 502) displaying the text string "Buy shoes at Shoe Store." The title may include an embedded hyperlink to a first-party resource associated with the search result. The search result is shown to further include a visible URL (i.e., URLs 304, 404, and 504) displaying the text string "www.shoestore.com/." The visible URL may be a URL to which the hyperlink in the title refers a shortened version of the hyperlink. The search result is shown to further include a text snippet (i.e., text snippets 306, 406, and 506) displaying the text string "We have the best selection of shoes in the Bay Area." The text snippet may be extracted from the associated first-party resource (e.g., extracted from the content of the resource located at www.shoestore.com/) if the search result is a first-party search result, or provided as creative text (e.g., an advertisement creative) by content providers 106 if the search result is a third-party content item.

Referring specifically to FIG. 3, a version 300 of the search result is shown without any highlighting. Version 300 may be the version of the search result provided as an input to search result enhancement system 116. Search result enhancement system 116 may also receive or generate a set of the query terms (e.g., the original query terms, an expanded list of query terms, etc.) used to identify the search result. For example, if the user-submitted search query is the text string "shoe stores bay area," search result enhancement system 116 may receive or generate the set of query terms {shoe, shoes, sneaker, sneakers, store, stores, bay, area}. The set of query terms may include the terms in the original query as well as synonyms of the original search terms or terms that have the same or similar meaning as one or more of the original search terms. For example, the expanded search term "sneaker" may have the similar meaning to the search term "shoe." The set of query terms may also include versions of the original query terms with adjusted plurality (i.e., adding the term "shoes" as the plural version of "shoe").

Referring specifically to FIG. 4, a version 400 of the search result is shown with query terms highlighted using conventional highlighting techniques. In version 400, every occurrence of a query term in the search result is highlighted. For example, the query terms "shoe," "store," "shoes," "bay," and "area" are shown with highlighting applied thereto. As shown in FIG. 4, each occurrence of a query term is highlighted (e.g., displayed in bold) in title 402, visible URL 404, and snippet 406 regardless of whether the query term (or a variant thereof) appears in other portions of the search result. For example, the query term "shoes" is highlighted in text snippet 406 even though a singular variant of the same query term (i.e., "shoe") is highlighted in title 402.

Referring specifically to FIG. 5, a version 500 of the search result is shown with query terms highlighted according to the highlighting criteria used by search result enhancement system 116. In version 500, occurrences of a query term in text snippet 506 are not highlighted if the same query term (or variant thereof) is highlighted in title 502. For example, the query term "shoes" is not highlighted in text snippet 506 because a singular variant of the same query term (i.e., "shoe") is highlighted in title 502. However, other query terms that do not appear in title 502 are still highlighted in text snippet 506. For example, the query terms "bay" and "area" are highlighted in text snippet 506 because neither of the terms "bay" or "area" (or a variant thereof) appear in title 502.

In general, the highlighting criteria used by search result enhancement system 116 may cause a query term to be displayed without highlighting in a second portion of the search result if the same query term (or variant thereof) is displayed with highlighting in a first portion of the search result. In the implementation shown in FIG. 5, title 502 is used as the first portion of the search result and text snippet 506 is used as the second portion of the search result such that a query term is not highlighted in text snippet 506 if the same query term is highlighted in title 502. However, the first portion of the search result may be title 502, visible URL 504, text snippet 506, or another portion of the search result in various implementations. Similarly, the second portion of the search result may be title 502, visible URL 504, text snippet 506, or another portion of the search result in various implementations.

Other highlighting techniques that may be used by search result enhancement system 116 include displaying a portion of the search result (e.g., the title, the visible URL, the text snippet, etc.) entirely without highlighting, only highlighting exact query terms (e.g., not highlighting synonyms or other variants of query terms), only highlighting each query term a limited number of times (e.g., once, twice, etc.) within the search result, only highlighting each query term a limited number of times within a portion of the search result (e.g., the title, the text snippet, etc.), and/or using the title as the second portion of the search result and the text snippet as the first portion of the search result (e.g., only highlighting a query term in the title if the same query term (or variant thereof) does not appear in the text snippet). Each of these highlighting techniques or any combination of such techniques may be used in various implementations.

Figure 6:
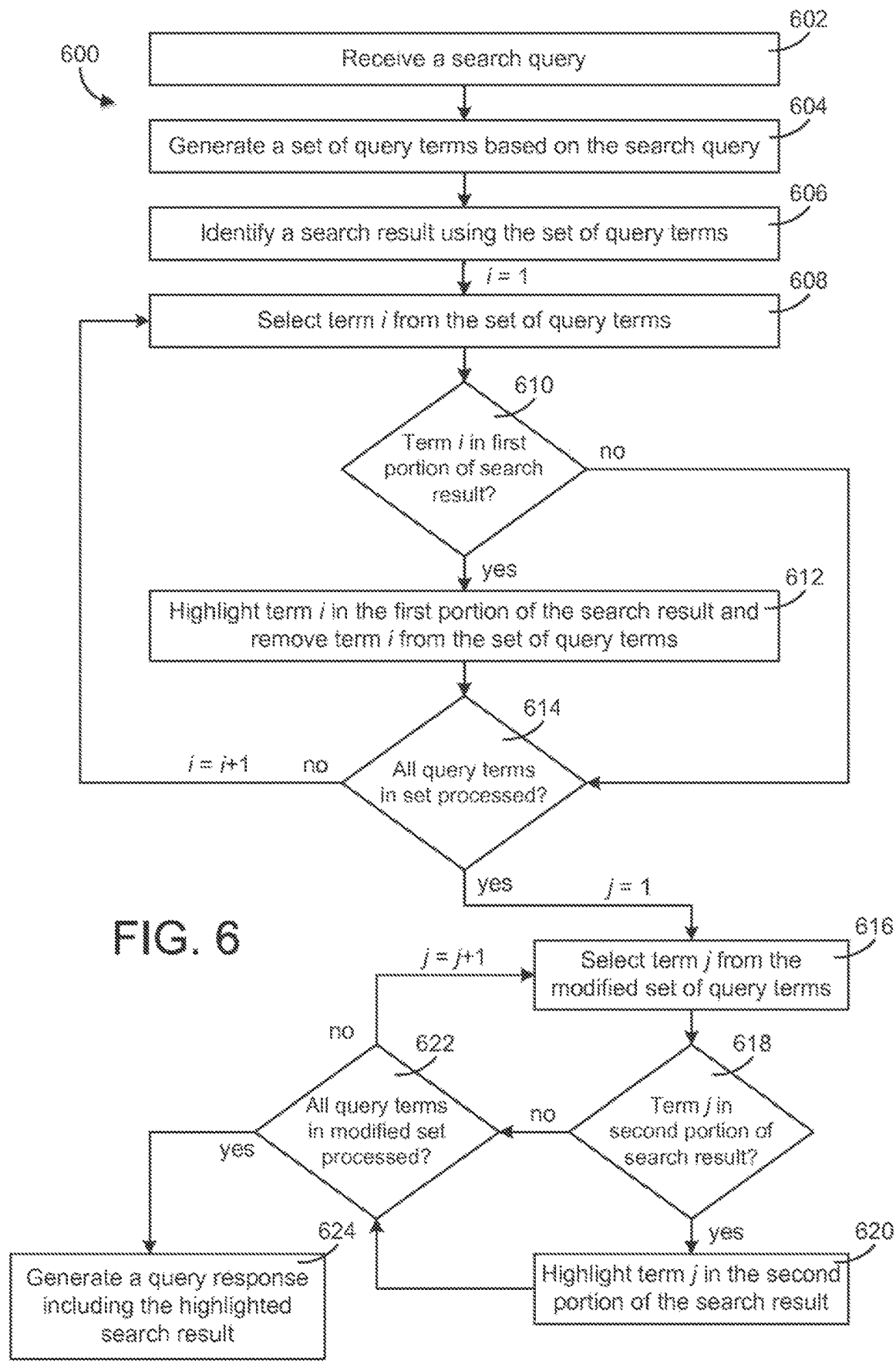
FIG. 6 is a flowchart of a process for enhancing search results for improved readability, according to a described implementation.

Referring now to FIG. 6, a flowchart of a process 600 for enhancing search results for improved readability is shown, according to a described implementation. Process 600 may be performed by search result enhancement system 116 using various modules of memory 134, as described with reference to FIG. 2. In various implementations, process 600 may be performed by computer system 100 (e.g., a combination of search result enhancement system 116, content server 112, and/or search engine 114) or a single system or device that includes the functionality of search result enhancement system 116, content server 112, and/or search engine 114.

Process 600 is shown to include receiving a search query (step 602) and generating a set of query terms based on the search query (step 604). In some implementations, the search query is a string of text received from a client device via an input feature (e.g., an input text box) of a search engine interface. Step 602 may include parsing the search query to identify one or more query terms. For example, if a client device submits the text string "cheap flowers bay area," step 602 may include identifying the query terms "cheap," "flowers," "bay," and "area."

Step 604 may include generating a set of query terms including the query terms identified in step 602. In some implementations, step 604 includes using various techniques to expand the user-submitted query terms. Such techniques may include identifying synonyms of the user-submitted query terms, adjusting the pluralization of the user-submitted query terms, and/or identifying additional terms that are semantically equivalent to one or more of the user-submitted query terms. Step 604 may include using query expansion techniques such as latent semantic indexing (LSI) to identify additional query terms that have the same meaning as the user-submitted query terms. For example, step 604 may include identifying the term "inexpensive" as a synonym for the query term "cheap," identifying the term "flower" as singular version of the term "flowers," and/or identifying the term "florist" as a semantic equivalent of the term "flowers" since the original query implies that the user is searching for a vendor that sells cheap flowers (i.e., a florist). In some implementations, step 604 includes correcting misspellings in the search query or suggesting alternative query terms based on the original query. Step 604 may include generating a set of query terms that includes both the original query terms and any expanded terms based on the original query.

Step 604 may include creating a data structure (e.g., an array, a vector, a list, etc.) representing the generated set of query terms. Each query term may be stored as a separate element of the data structure. For example, if a client device submits the text string "cheap flowers bay area," step 604 may include generating and storing the following data structure: {cheap, inexpensive, flower, flowers, florist, bay, area} where the query terms "cheap," "flowers," "bay," and "area" are part of the original search string and the query terms "inexpensive," "flower," and "florist" are expanded terms added to the set of query terms in step 604. Step 604 may include storing the data structure in memory for use in subsequent steps of process 600.

Still referring to FIG. 6, process 600 is shown to include identifying a search result using the set of query terms (step 606). In some implementations, step 606 includes identifying one or more search results that are relevant to set of query terms. Search results may include hyperlinks to first-party resources, third-party content items, or a combination of both. In some implementations, step 606 includes selecting one or more third-party content items from a database of third-party content items. Step 606 may include selecting third-party content items that are relevant to the set of query terms. Step 606 may include searching an index of first-party resources (e.g., documents, webpages, etc.) for relevant first-party search results using the identified query terms. Step 606 may include identifying one or more search results that are determined to be relevant to the set of query terms.

In other implementations, step 606 includes receiving a collection of search results from content server 112 and/or search engine 114. The search results may be generated by content server 112 and/or search engine 114 and received via network 102 in step 606. In such an implementation, step 606 may include receiving the search results and identifying the search results as relevant to the set of query terms.

In some implementations, step 606 includes formatting each search result to include multiple textual portions. For example, step 606 may include formatting each search result to include a title with an embedded hyperlink, a visible URL displaying a portion of the URL associated with hyperlink, and/or a text snippet (e.g., a descriptive text snippet extracted from a first-party resource, an ad creative, etc.). In some instances, the textual portions may include one or more of the query terms.

Still referring to FIG. 6, process 600 is shown to include selecting a query term (i.e., term i) from the set of query terms (step 608) and determining whether term i appears in the first portion of the search result (step 610). The variable i may be an iterative variable denoting a particular query term from among the set of query terms generated in step 604. For example, the set of query terms may be represented by the data structure {cheap, inexpensive, flower, flowers, florist, bay, area}, where the text string "cheap" is the first query term (i.e., i=1), the text string "inexpensive" is the second query term (i.e., i=2), the text string "flower" is the third query term (i.e., i=3), etc. The value of variable i may be set to an initial value of i=1 the first time step 608 is performed and incremented each subsequent time step 608 is performed.

Step 608 may include retrieving the data structure representing the set of query terms from a memory device in which the data structure is stored. Step 608 may further include identifying a particular element of the data structure corresponding to the current value of the iterative variable i and extracting a text string from the identified element of the data structure. For example, if the value of the iterative variable is i=1, step 608 may include selecting the first element of the data structure and extracting the text string (i.e., "cheap") stored in the first element of the data structure. For each subsequent iteration of step 608, the text string stored in the next element of the data structure may be extracted.

Step 610 may include parsing the first portion of the search result to determine whether the extracted text string corresponding to the selected query term i appears in the first portion of the search result. The first portion of the search result may be the title, visible URL, text snippet, or any other textual portion of the search result. If the text string defined by the selected query term matches a text string that appears in the first portion of the search result, step 610 may include determining that the selected query term i appears in the first portion of the search result. For example, if the first portion of the search result includes the text string "Buy shoes at shoe store" and the text string "shoes" is extracted from the ith element of the data structure representing the set of query terms, step 610 may determine that the ith query term (i.e., "shoes") appears in the first portion of the search result.

If query term i appears in the first portion of the search result (i.e., the result of step 610 is "yes"), process 600 may proceed to highlighting term i in the first portion of the search result and removing term i from the set of query terms (step 612). Highlighting a query term may include at least one of bolding the query term, underlining the query term, increasing a display size of the query term, adjusting a display color of the query term, adjusting a background color of the query term, or otherwise highlighting or emphasizing the query term in the search result. Highlighting a query term may include inserting HTML tags (e.g., bold tags, italics tags, strong tags, underline tags, CSS tags, etc.) around the query term in the search result such that the query term is highlighted according to the HTML tags when the search result is rendered.

Removing a query term from the set of query terms may generate a modified set of query terms. The modified set of query terms may be specific to the search result and may be further modified by each subsequent iteration of step 612. The modified set of query terms may be stored as a data element (e.g., an array, a vector, a list, etc.) in a data storage device, where each element of the data structure corresponds to one of the query terms in the modified set of query terms. For example, the set of query terms generated in step 604 may be represented by the data structure {cheap, inexpensive, flower, flowers, florist, bay, area}. Step 612 may include removing one or more terms from the data structure to create a modified data structure representing the modified set of query terms. The modified data structure may include a subset of the original query terms. For example, if the query terms "cheap" and "bay" appear in the first portion of the search result, step 612 may include removing the "cheap" and "bay" elements from the original data structure such that the modified data structure is {inexpensive, flower, flowers, florist, area}.

If query term i does not appear in the first portion of the search result (i.e., the result of step 610 is "no") or after performing step 612, process 600 may proceed to determining whether all query terms in the set of query terms have been processed (step 614). The set of query terms referred to in step 614 may be the set of query terms generated in step 604. If any of the set of query terms remain to be processed (i.e., the result of step 614 is "no"), process 600 may increment the value of the variable i to i=i+1 and repeat steps 608-614. Steps 608-614 may be repeated until each of the query terms in the set of query terms have been processed (i.e., the result of step 614 is "yes").

Still referring to FIG. 6, process 600 is shown to include a query term (i.e., term j) from the modified set of query terms (step 616) and determining whether term j appears in the second portion of the search result (step 618). The variable j may be an iterative variable denoting a particular query term from among the modified set of query terms generated in step 612 (i.e., the query terms that were not highlighted in the first portion of the search result). The value of variable j may be set to an initial value of j=1 the first time step 616 is performed and incremented each subsequent time step 616 is performed. The second portion of the search result may be the title, visible URL, text snippet, or any other textual portion of the search result.

If query term j appears in the second portion of the search result (i.e., the result of step 618 is "yes"), process 600 may proceed to highlighting term j in the second portion of the search result (step 620). If query term j does not appear in the second portion of the search result (i.e., the result of step 618 is "no") or after performing step 620, process 600 may proceed to determining whether all query terms in the modified set of query terms have been processed (step 622). The modified set of query terms referred to in step 622 may be the set of query terms generated in step 612. If any of the modified set of query terms remain to be processed (i.e., the result of step 622 is "no"), process 600 may increment the value of the variable j to j=j+1 and repeat steps 616-622. Steps 616-622 may be repeated until each of the query terms in the modified set of query terms have been processed (i.e., the result of step 622 is "yes").

Still referring to FIG. 6, process 600 is shown to include generating a query response including the highlighted search result (step 624). The highlighted search result may have query terms highlighted in the first portion and/or second portion of the search result. However, if a query term is highlighted in the first portion of the search result, the same query term may not be highlighted in the second portion of the search result. The query response may be provided in the form of a search results page to the client device originating the query. In some implementations, the query response includes a plurality of search results. The query response may include first-party search results, third-party search results, or a combination of both. In some implementations, step 624 includes presenting the first-party search results and the third-party search results in different portions of the search results page or otherwise distinguishing between first-party search results and third-party search results to avert confusion.

Figure 7:
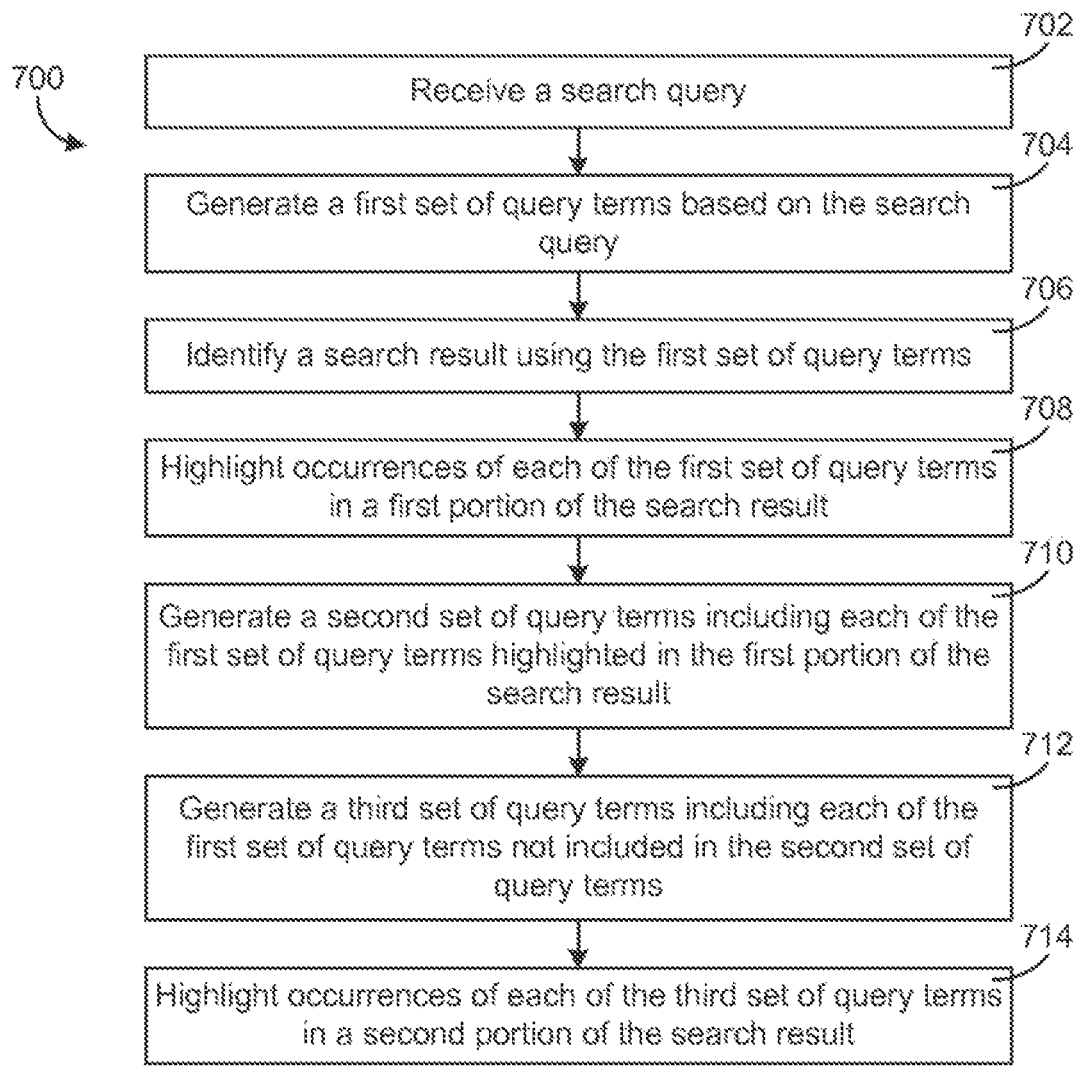
FIG. 7 is a flowchart of another process for enhancing search results for improved readability, according to a described implementation.

Referring now to FIG. 7, a flowchart of another process 700 for enhancing search results for improved readability is shown, according to a described implementation. Process 700 may be performed by search result enhancement system 116 using various modules of memory 134, as described with reference to FIG. 2. In various implementations, process 700 may be performed by computer system 100 (e.g., a combination of search result enhancement system 116, content server 112, and/or search engine 114) or a single system or device that includes the functionality of search result enhancement system 116, content server 112, and/or search engine 114.

Process 700 is shown to include receiving a search query (step 702), generating a first set of query terms based on the search query (step 704), and identifying a search result using the first set of query terms (step 706). Steps 702-706 may be the same or similar to steps 602-606 of process 600, as described with reference to FIG. 6. The first set of query terms may include all of the query terms generated in step 704.

Still referring to FIG. 7, process 700 is shown to include highlighting occurrences of each of the first set of query terms in a first portion of the search result (step 708). Highlighting a query term may include at least one of bolding the query term, underlining the query term, increasing a display size of the query term, adjusting a display color of the query term, adjusting a background color of the query term, or otherwise highlighting or emphasizing the query term in the search result. Highlighting a query term may include inserting HTML tags (e.g., bold tags, italics tags, strong tags, underline tags, CSS tags, etc.) around the query term in the search result such that the query term is highlighted according to the HTML tags when the search result is rendered. The first portion of the search result may be the title, visible URL, text snippet, or any other textual portion of the search result.

Process 700 is shown to include generating a second set of query terms including each of the first set of query terms highlighted in the first portion of the search result (step 710) and generating a third set of query terms including each of the first set of query terms not included in the second set of query terms (step 712). The second set of query terms and the third set of query terms may be discrete sets that together include all of the query terms in the first set. Each search result may have a different second set of query terms and a different third set of query terms relative to other search results. For example, the set of query terms generated in step 704 (i.e., the first set of query terms) may be represented by the data structure {cheap, inexpensive, flower, flowers, florist, bay, area}. If the query terms "cheap" and "bay" appear in the first portion of the search result, step 712 may include creating the second data structure {cheap, bay} including the terms "cheap" and "bay" as elements of the second data structure. The second data structure represents the second set of query terms. Generating the third set of query terms may include creating a third data structure by removing the "cheap" and "bay" elements from the first data structure. For example, the third set of query terms may be represented by the data structure {inexpensive, flower, flowers, florist, area}. The second and third data structures may be stored in a memory device.

Still referring to FIG. 7, process 700 is shown to include highlighting occurrences of each of the third set of query terms in a second portion of the search result (step 714). For each search result, the third set of query terms may be the same or similar to the modified set of query terms generated in step 612 of process 600. The highlighted search result may have query terms highlighted in the first portion and/or second portion of the search result. However, if a query term is highlighted in the first portion of the search result, the same query term may not be highlighted in the second portion of the search result.

Implementations of the subject matter and the operations described in this specification may be implemented in digital electronic circuitry, or in computer software, firmware, or hardware, including the structures disclosed in this specification and their structural equivalents, or in combinations of one or more of them. Implementations of the subject matter described in this specification may be implemented as one or more computer programs, i.e., one or more modules of computer program instructions, encoded on one or more computer storage medium for execution by, or to control the operation of, data processing apparatus. Alternatively or in addition, the program instructions may be encoded on an artificially generated propagated signal (e.g., a machine-generated electrical, optical, or electromagnetic signal) that is generated to encode information for transmission to suitable receiver apparatus for execution by a data processing apparatus. A computer storage medium may be, or be included in, a computer-readable storage device, a computer-readable storage substrate, a random or serial access memory array or device, or a combination of one or more of them. Moreover, while a computer storage medium is not a propagated signal, a computer storage medium may be a source or destination of computer program instructions encoded in an artificially generated propagated signal. The computer storage medium may also be, or be included in, one or more separate components or media (e.g., multiple CDs, disks, or other storage devices). Accordingly, the computer storage medium is both tangible and non-transitory.

The operations described in this disclosure may be implemented as operations performed by a data processing apparatus on data stored on one or more computer-readable storage devices or received from other sources.

The term "client or "server" include all kinds of apparatus, devices, and machines for processing data, including by way of example a programmable processor, a computer, a system on a chip, or multiple ones, or combinations, of the foregoing. The apparatus may include special purpose logic circuitry, e.g., a field programmable gate array (FPGA) or an application specific integrated circuit (ASIC). The apparatus may also include, in addition to hardware, code that creates an execution environment for the computer program in question (e.g., code that constitutes processor firmware, a protocol stack, a database management system, an operating system, a cross-platform runtime environment, a virtual machine, or a combination of one or more of them). The apparatus and execution environment may realize various different computing model infrastructures, such as web services, distributed computing and grid computing infrastructures.

The systems and methods of the present disclosure may be completed by any computer program. A computer program (also known as a program, software, software application, script, or code) may be written in any form of programming language, including compiled or interpreted languages, declarative or procedural languages, and it may be deployed in any form, including as a stand alone program or as a module, component, subroutine, object, or other unit suitable for use in a computing environment. A computer program may, but need not, correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform actions by operating on input data and generating output. The processes and logic flows may also be performed by, and apparatus may also be implemented as, special purpose logic circuitry (e.g., an FPGA or an ASIC).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data (e.g., magnetic, magneto-optical disks, or optical disks). However, a computer need not have such devices. Moreover, a computer may be embedded in another device (e.g., a mobile telephone, a personal digital assistant (PDA), a mobile audio or video player, a game console, a Global Positioning System (GPS) receiver, or a portable storage device (e.g., a universal serial bus (USB) flash drive), etc.). Devices suitable for storing computer program instructions and data include all forms of non volatile memory, media and memory devices, including by way of example semiconductor memory devices (e.g., EPROM, EEPROM, and flash memory devices; magnetic disks, e.g., internal hard disks or removable disks; magneto-optical disks; and CD ROM and DVD-ROM disks). The processor and the memory may be supplemented by, or incorporated in, special purpose logic circuitry.

To provide for interaction with a user, implementations of the subject matter described in this specification may be implemented on a computer having a display device (e.g., a CRT (cathode ray tube), LCD (liquid crystal display), OLED (organic light emitting diode), TFT (thin-film transistor), or other flexible configuration, or any other monitor for displaying information to the user and a keyboard, a pointing device, e.g., a mouse, trackball, etc., or a touch screen, touch pad, etc.) by which the user may provide input to the computer. Other kinds of devices may be used to provide for interaction with a user as well; for example, feedback provided to the user may be any form of sensory feedback (e.g., visual feedback, auditory feedback, or tactile feedback), and input from the user may be received in any form, including acoustic, speech, or tactile input. In addition, a computer may interact with a user by sending documents to and receiving documents from a device that is used by the user; for example, by sending web pages to a web browser on a user's client device in response to requests received from the web browser.

Implementations of the subject matter described in this disclosure may be implemented in a computing system that includes a back-end component (e.g., as a data server), or that includes a middleware component (e.g., an application server), or that includes a front end component (e.g., a client computer) having a graphical user interface or a web browser through which a user may interact with an implementation of the subject matter described in this disclosure, or any combination of one or more such back end, middleware, or front end components. The components of the system may be interconnected by any form or medium of digital data communication (e.g., a communication network). Examples of communication networks include a LAN and a WAN, an inter-network (e.g., the Internet), and peer-to-peer networks (e.g., ad hoc peer-to-peer networks).

While this specification contains many specific implementation details, these should not be construed as limitations on the scope of any disclosures or of what may be claimed, but rather as descriptions of features specific to particular implementations of particular disclosures. Certain features that are described in this disclosure in the context of separate implementations may also be implemented in combination in a single implementation. Conversely, various features that are described in the context of a single implementation may also be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products embodied on one or more tangible media.

The features disclosed herein may be implemented on a smart television module (or connected television module, hybrid television module, etc.), which may include a processing circuit configured to integrate internet connectivity with more traditional television programming sources (e.g., received via cable, satellite, over-the-air, or other signals). The smart television module may be physically incorporated into a television set or may include a separate device such as a set-top box, Blu-ray or other digital media player, game console, hotel television system, and other companion device. A smart television module may be configured to allow viewers to search and find videos, movies, photos and other content on the web, on a local cable TV channel, on a satellite TV channel, or stored on a local hard drive. A set-top box (STB) or set-top unit (STU) may include an information appliance device that may contain a tuner and connect to a television set and an external source of signal, turning the signal into content which is then displayed on the television screen or other display device. A smart television module may be configured to provide a home screen or top level screen including icons for a plurality of different applications, such as a web browser and a plurality of streaming media services (e.g., Netflix, Vudu, Hulu, etc.), a connected cable or satellite media source, other web "channels", etc. The smart television module may further be configured to provide an electronic programming guide to the user. A companion application to the smart television module may be operable on a mobile computing device to provide additional information about available programs to a user, to allow the user to control the smart television module, etc. In alternate implementations, the features may be implemented on a laptop computer or other personal computer, a smartphone, other mobile phone, handheld computer, a tablet PC, or other computing device.

Thus, particular implementations of the subject matter have been described. Other implementations are within the scope of the following claims. In some cases, the actions recited in the claims may be performed in a different order and still achieve desirable results. In addition, the processes depicted in the accompanying figures do not necessarily require the particular order shown, or sequential order, to achieve desirable results. In certain implementations, multitasking and parallel processing may be advantageous.

The construction and arrangement of the systems and methods as shown in the various illustrated implementations are examples only. Although only a few implementations have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative implementations. Other substitutions, modifications, changes, and omissions may be made in the design, operating conditions and arrangement of the exemplary implementations without departing from the scope of the present disclosure.

The present disclosure contemplates methods, systems and program products on any machine-readable media for accomplishing various operations. The implementations of the present disclosure may be implemented using existing computer processors, or by a special purpose computer processor for an appropriate system, incorporated for this or another purpose, or by a hardwired system. Implementations within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A system to enhance content items, comprising:
    a communications interface to receive an acoustic search query from a client device via a computer network; and
    a processing circuit comprising a processor and memory, wherein the processing circuit:
        generates a set of query terms based on the acoustic search query;
        identifies a first content item based on the set of query terms, the first content item including a first textual portion and a second textual portion, the first textual portion different from the second textual portion;
        performs, for a first query term in the set of query terms, a first enhancement operation to:
            determine an occurrence of the first query term in at least one string of a plurality of strings in the first textual portion; and
            responsive to the occurrence of the first query term in the first portion, enhance the at least one string in the first query term in the first textual portion and remove the first query term from the set of query terms; and
        subsequent to removal of the first query term from the set of query terms, perform, for a second query term that remains in the set of query terms, a second enhancement operation to:
            determine an occurrence of the second query term in at least one string of a plurality of strings in the second portion; and
            responsive to the occurrence of the second query term in the second portion, enhance the at least one string in the second query term in the second textual portion;
        generate a second content item including the plurality of strings of the first textual portion and the plurality of strings of the second textual portion of the first content item, the plurality of strings of the first textual portion having the at least one enhanced string corresponding to the occurrence of the first query term, the plurality of strings of the second textual portion having the at least one enhanced string corresponding to the occurrence of the second query term; and provide the second content item to the client device to present, responsive to the acoustic search query.

2. The system of claim 1, wherein the content item comprises an auditory content item.

3. The system of claim 1, wherein the acoustic search query comprises speech.

4. The system of claim 1, wherein the first and second enhancement operations comprises emphasizing the first and second query terms.

5. The system of claim 1, wherein the first query term and the second query term are each only enhanced once.

6. The system of claim 1, wherein the processing circuit is configured to:
identify a plurality of content items;
perform the first and second enhancement operations for each of the plurality of content items; and
subsequent to the performed first and second enhancement operations, provide the plurality of content items to the client device.

7. The method of claim 1, wherein the content item comprises a hyperlink to an indexed first-party resource.

8. The method of claim 1, wherein the first textual portion comprises a title of the content item.

9. A method of enhancing content items, comprising:
receiving an acoustic search query at a processing circuit comprising a processor and memory;
generating, by the processing circuit, a set of query terms based on the acoustic search query;
identifying, by the processing circuit, a first content item based on the set of query terms, the content item including a first textual portion and a second textual portion, the first textual portion different from the second textual portion;
performing, by the processing circuit and for a first query term in the set of query terms, a first enhancement operation comprising:
determining an occurrence of the first query term in at least one string of a plurality of strings in the first textual portion; and
responsive to the occurrence of the first query term in the first textual portion, enhancing the at least one string in the first query term in the first textual portion and removing the first query term from the set of query terms; and
subsequent to removal of the first query term from the set of query terms, performing, by the processing circuit and for a second query term that remains in the set of query terms, a second enhancement operation comprising:
determining an occurrence of the second query term in at least one string of a plurality of strings in the second textual portion; and
responsive to the occurrence of the second query term in the second textual portion, enhancing the at least one string in the second query term in the second textual portion; and
generating, by the processing circuit, a second content item including the plurality of strings of the first textual portion and the plurality of strings of the second textual portion, the plurality of strings of the first textual portion having the at least one enhanced string corresponding to the occurrence of the first query term, the plurality of strings of the second textual portion having the at least one enhanced string corresponding to the occurrence of the second query term; and
providing, by the processing circuit, the content item to the client device to present, responsive to the acoustic search query, the content item including the enhanced first textual portion and the enhanced second textual portion.

10. The method of claim 9, wherein the content item comprises an auditory content item.

11. The method of claim 9, wherein the acoustic search query comprises speech.

12. The method of claim 9, wherein the first and second enhancement operations comprises emphasizing the first and second query terms.

13. The method of claim 9, wherein the first query term and the second query term are each only enhanced once.

14. The method of claim 9, comprising:
identifying a plurality of content items;
performing the first and second enhancement operations for each of the plurality of content items; and
subsequent to performing the first and second enhancement operations, providing the plurality of content items to the client device.

15. A method of enhancing content items, the method comprising:
receiving, at a processing circuit via a computer network, an acoustic search query from a client device;
generating, by the processing circuit, a first set of query terms based on the acoustic search query;
identifying, by the processing circuit, a first content item based on the first set of query terms, the first content item including a first textual portion and a second textual portion;
enhancing, by the processing circuit, occurrences of each of the first set of query terms in at least one string of a plurality of strings in the first textual portion of the first content item, the first textual portion different from the second textual portion;
generating, by the processing circuit, a second set of query terms including each of the query terms enhanced in the first textual portion of the first content item;
generating, by the processing circuit, a third set of query terms comprising each of the first set of query terms not included in the second set of query terms;
enhancing, by the processing circuit, occurrences of each of the third set of query terms in at least one string of a plurality of strings in the second textual portion of the first content item;
generating, by the processing circuit, a second content item including the plurality of strings of the first textual portion and the plurality of strings of the second textual portion, the plurality of strings of the first textual portion having the at least one enhanced string corresponding to the occurrence of each of the first set of query terms, the plurality of strings of the second textual portion having the at least one enhanced string corresponding to the occurrence of each of the third set of query terms; and
providing, by the processing circuit, the second content item to the client device to present, responsive to the acoustic search query.

16. The method of claim 15, wherein the content item comprises an auditory content item.

17. The method of claim 15, wherein the acoustic search query comprises speech.

18. The method of claim 15, wherein enhancing the occurrences of each of the first and second set of query terms comprises emphasizing the occurrences of each of the first and second set of query terms.

19. The method of claim 15, wherein the first query term and the second query term are each only enhanced once.

20. The method of claim 15, comprising:
identifying a plurality of content items;
performing the first and second enhancement operations for each of the plurality of content items; and
subsequent to performing the first and second enhancement operations, providing the plurality of content items to the client device.

* * * * *